United States Patent Office 3,022,451
Patented Feb. 20, 1962

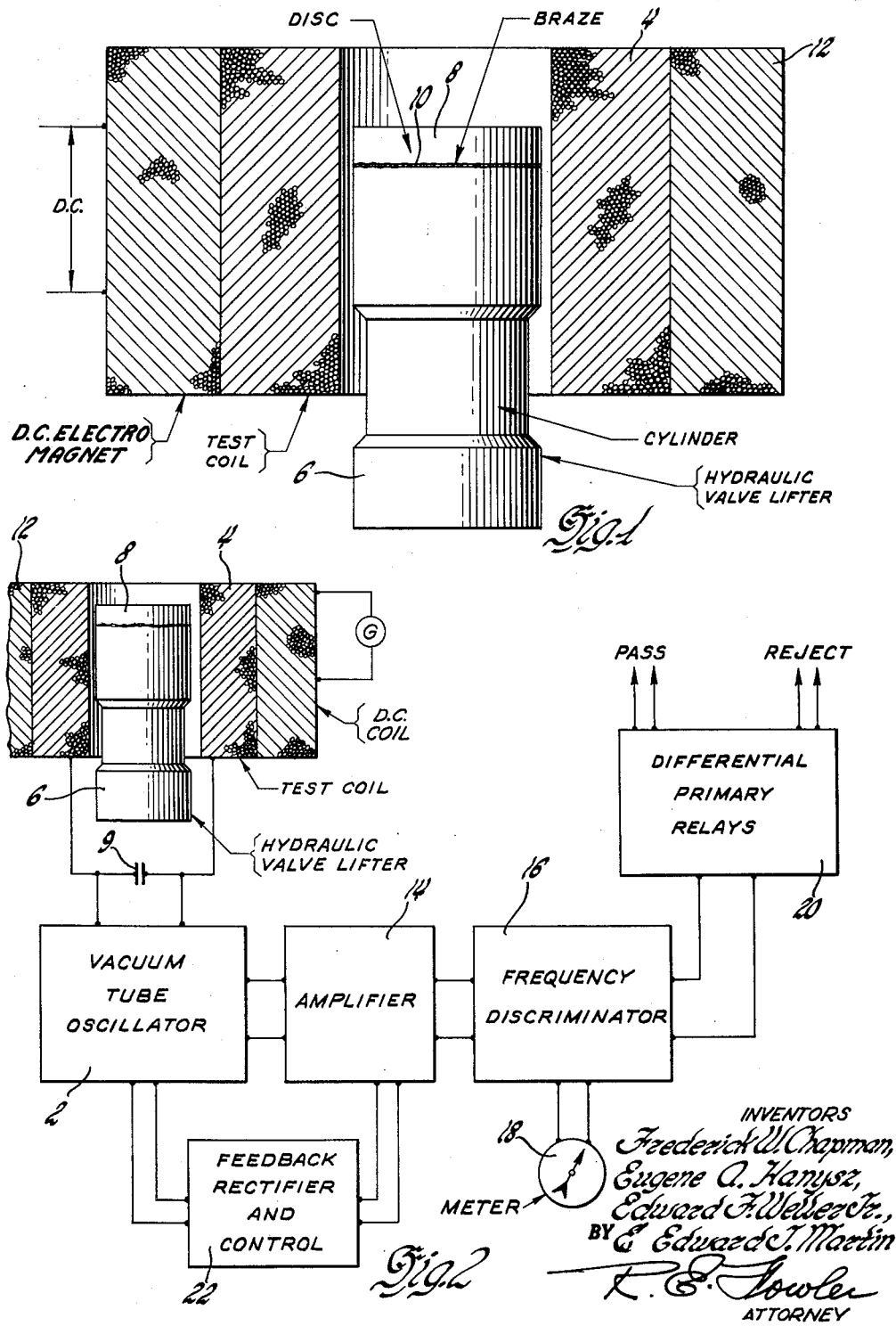

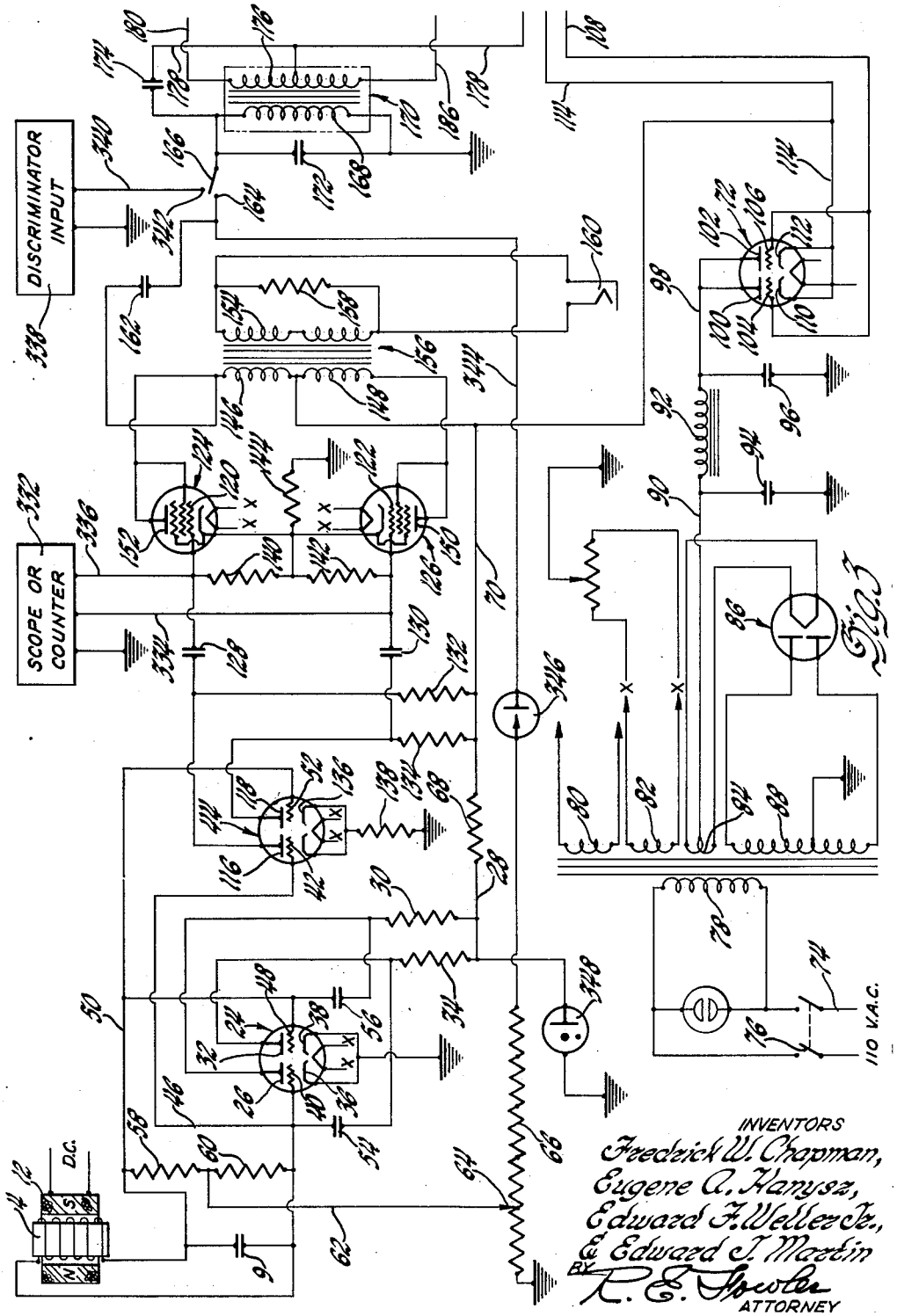

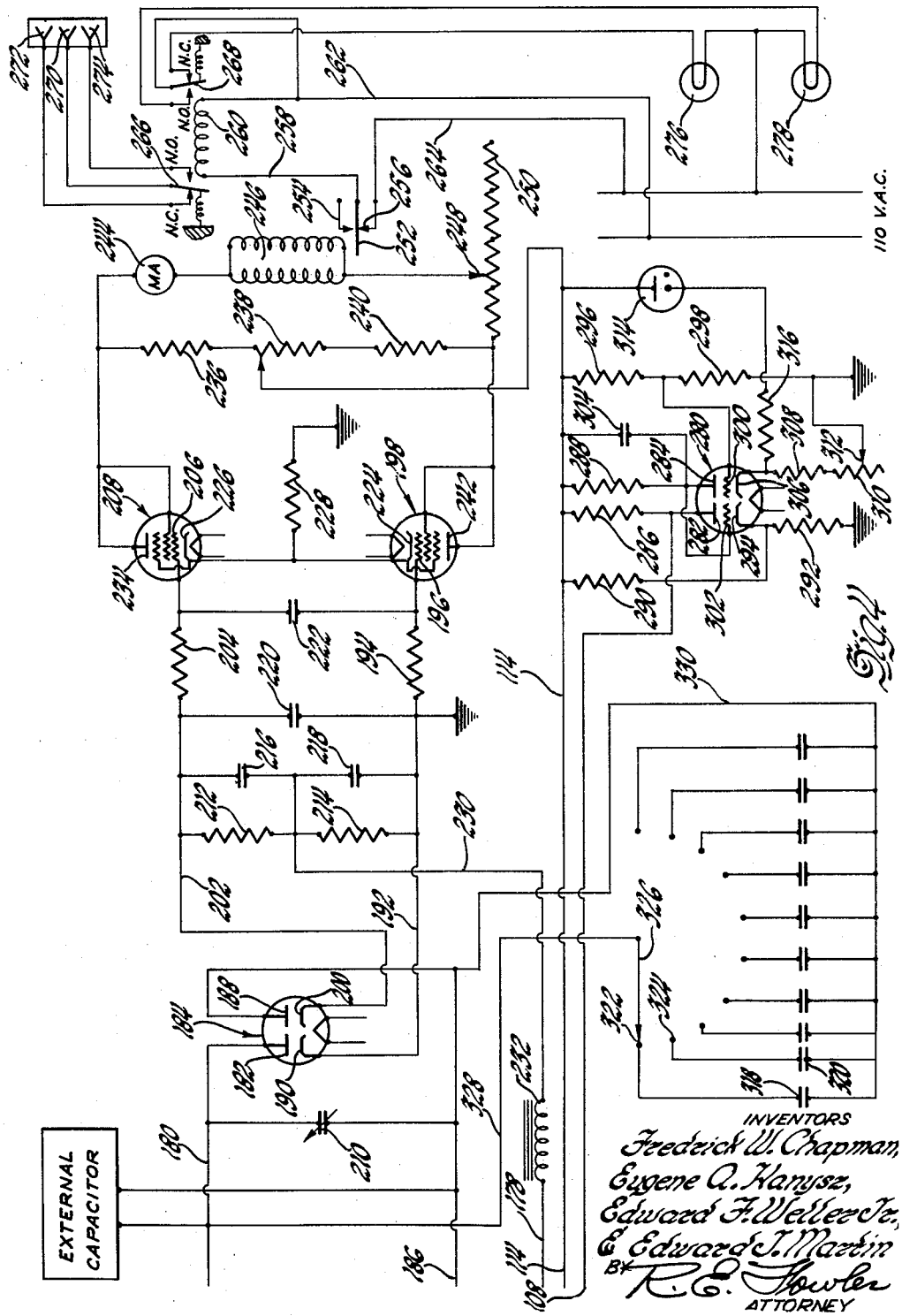

3,022,451
ELECTROMAGNETIC TESTING EQUIPMENT
Frederick W. Chapman, Birmingham, Eugene A. Hanysz, Royal Oak, Edward F. Weller, Jr., Detroit, and Edward J. Martin, Pleasant Ridge, Mich., assignors to General Motors Corporation, Detroit, Mich., a corporation of Delaware
Filed June 26, 1957, Ser. No. 668,146
3 Claims. (Cl. 317—146)

This invention relates to means for production testing fabricated parts and more particularly to testing means utilizing frequency controlled oscillators for actuating either selecting or indicating means for the classification of parts.

In the fabrication or assembly of bodies formed of a plurality of individual parts, welded or brazed together, it is essential to test the final composite body to assure that the elements are firmly held together since the separation thereof after assembly of the body in complex machines may cause costly and time consuming repairs.

Our invention has broad application to the general testing of composite bodies. As an example, however, of a use for the testing equipment reference is made to the fabrication of hydraulic valve lifters for use in automotive engines. Currently certain valve lifters are formed of two parts, one a main cylindrical part to one end of which there is rigidly secured a disk. The disk is brazed to the end of the cylinder and in order to assure a satisfactory joint, a small ring of silver solder is interposed between the cylinder and the end of the disk during the brazing operation to provide "wetting" to insure good bonding between the parts. Since this procedure requires mechanical handling of the parts in inserting the silver ring and then moving the several parts to a brazing position, the ring of silver solder occasionally slips from its position and is lost and the joint or bond developed between the disk and cylinder would not be satisfactory for commercial usage. However, after the two have been brazed they may appear externally to be satisfactory while internally the joint is weak. The current testing method will, however, disclose any difficulties or weak bondings in such a joint. It is evident that there is a wide variety of other instances where our system is also usable.

It is therefore an object in making this invention to provide means for testing a composite body to assure satisfactory bondings between the various parts.

It is a further object in making this invention to provide a non-destructive testing method for checking the bondings between sections of fabricated bodies.

It is a still further object in making this invention to provide high frequency bond testing means for quickly classifying fabricated parts as satisfactory or unsatisfactory.

With the above and other objects in view which will become apparent as the specification proceeds, our invention will be best understood by reference to the following specification and claims and the illustrations in the accompanying drawings, in which:

FIGURE 1 is an enlarged vertical section through the test coil of our invention showing a composite part to be tested in position.

FIGURE 2 is a block diagram of the testing system of our invention connected to the test coil.

FIGURES 3 and 4 combine to form the complete circuit diagram of our high frequency test circuit for classifying fabricated parts.

In general, the system of our invention is based upon the tuning of a vacuum tube oscillator by the insertion of a test part in the tuning circuit. The test coil which is an inductance included in the tuning circuit of the oscillator, controls the frequency of the oscillator depending upon the characteristics of the part inserted in test position therein. If the composite part bond is satisfactory and tight, the frequency of the oscillator will be a given value. If the bonding is not 100%, but satisfactory, the frequency may be slightly displaced and if the bonding is poor and the parts liable to become disconnected, the frequency will be still further removed.

The output of the oscillator is amplified and then applied to a frequency discriminator which can be adjusted to operate about a certain reference frequency to impose voltages increasing in the positive or negative direction therefrom as the frequency changes. This output voltage may then be used to either operate classifying relays or to operate an indicating meter to give the tester an indication of the soundness of the bond.

The system is best shown in general, in FIGURE 2 and in that instance the oscillator is shown at 2 and there is connected to its input a test coil 4 within which the part to be tested may be inserted in order to change the inductance. A condenser 9 is connected across the test coil 4 and together with the coil determines the frequency of oscillation of the oscillator. The part to be tested is illustratively shown as being a hydraulic valve lifter 6, to one end of which a disk 8 has been brazed as shown.

FIGURE 1 is an enlarged showing of the assembly and in that instance the main body 6 of the valve lifter is shown with the disk 8 attached to the upper end by a brazed area 10. The test coil 4 is surrounded by a larger magnetizing coil 12 which is fed a large direct current. The purpose of the magnetizing coil is to produce a strong D.C. magnetizing field to maintain the permeability of the part under test (the hydraulic valve lifter) at uniformity during the testing operation. This removes any error which may be introduced by a variation in permeability of the part during the testing operation and leaves only a signal due to the soundness of the bond. As previously mentioned, the output of the oscillator is fed into an amplifying section 14 and thence into a discriminator 16. An indicating meter 18 may indicate the output of the discriminator to advise how far from the desired frequency the particular part tunes the oscillator and whether or not the bond is satisfactory. The output of the discriminator may also be connected to classifying relays 20 which may control the path of the part to either an acceptable or a reject bin. In order to further stabilize the operation of the system, a stabilizing feedback circuit 22 is connected between the amplifier and the oscillator.

Having described the component parts of our testing system in general, reference is now made to composite FIGURES 3 and 4 which show the details of the various portions of the circuit.

FIGURE 3 illustrates in the upper lefthand corner the test coil 4 across which the tuning condenser 9 is connected in the input to the oscillator which includes tube 24. This oscillator stage has its frequency controlled by the composite part which is inserted within the test coil 4. The part is so placed within the test coil 4 that the resulting magnetic flux generated within the hydraulic valve lifter cylinder passes through the brazed bond at right angles to the surface. In such a part as herein described the conductivity of the silver solder is higher than that of the two steel parts joined. The flux therefore meets with opposition because of the variation of eddy current generation at the interface between the silver layer and steel. These variations together with variations in the permeability of the flux path cause an inductance shift in the test coil which is used to differentiate between satisfactory and unsatisfactory parts.

The oscillator is of the push-pull type. The plate 26 of the first section being connected to power line 28 through biasing resistance 30 and plate 32 of the second section being likewise connected to power line 28 through a similar resistance 34. The cathodes 36 and 38 are connected directly to ground. The control grid 40 of the first triode section is directly connected to the tunable circuit utilizing test coil 4 and condenser 9 and is likewise directly connected to control grid 42 of the amplifier stage tube 44 through line 46. Control grid 48 of the second triode section of the tube 24 is connected to line 50 which extends from one terminal of the test coil 4 to the control grid 52 of the second section of the amplifying tube 44. A coupling condenser 54 is connected between plate 32 and grid 40 and in a similar manner, since this is a push-pull type oscillator, condenser 56 is connected between plate 26 and grid 48. A pair of resistances in series, 58 and 60, forming a voltage divider are connected across between line 50 and grid 40. A center tap between these two resistances is connected through line 62 to an adjustable tap 64 movable over a resistance 66 and forming therewith a potentiometer for controlling the amplitude of the signal. The frequency output of the push-pull oscillator stage 24 is fed into the amplifying stage 44 for amplification.

A dropping resistor 68 is connected between power line 28 and a higher power line 70 which extends directly to the output of the series regulator tube 72. The voltage is supplied from the conventional 110 volt A.C. mains 74 through main off-on switch 76 to the primary 78 of a multi-secondary winding transformer. Winding 80 of the secondary is adapted to supply the low voltage for certain desired purposes. Secondary 82 is adapted to supply power at low voltages to the heater circuits of the various tubes marked "XX." Secondary 84 is adapted to supply power to the filament of the rectifier 86 and secondary 88 to supply power for the anodes of the rectifier. The center taps of these last two windings are connected to ground and line 90, respectively, and the D.C. voltage output of the rectifier is applied to transmission line 90 and passed through a filter consisting of choke 92 and a pair of condensers 94 and 96 connected from each end of the choke to ground. The final filtered output is applied to line 98 where it is connected to the series regulating tube 72 and extends to the two commonly connected plates 100 and 102 of tube 72. The control grids 104 and 106 of the tube 72 are commonly connected to line 108 for supplying the regulating bias from tube 280. Cathodes 110 and 112 are commonly connected to the main output line 114 which is in turn connected to main power supply line 70 as shown. This section supplies all the necessary power requirements for the various portions of the test circuit.

The plates 116 and 118 of the amplifier section 44 are connected respectively to the control grids 120 and 122 of a further push-pull amplifying stage including tubes 124 and 126 through coupling condensers 128 and 130. Thus as the push-pull oscillator has its signals amplified by stage 44 they are alternately applied to grids 120 and 122 of the tubes 124 and 126. The plates 116 and 118 are supplied with power from main voltage supply line 70 through resistances 132 and 134. The common cathodes 136 of tube 44 are connected to ground through biasing resistor 138. Two resistances 140 and 142 are connected in series across the grids 120 and 122 and their intermediate point is connected to the cathodes of both tubes 126 and 124 and thence through a biasing resistor 144 to ground. The output of the push-pull amplifier 124—126 is connected across a balanced primary consisting of two halves 146 and 148. Plate 150 of tube 126 is connected to the outside terminal of primary 148 and plate 152 is, in a similar manner, connected to the outside terminal of primary 146. The common terminal of each of these primary coils is directly connected to main power line 70. The secondary 154 of transformer 156 has a resistance 158 connected thereacross and likewise a phone jack switch 160 in shunt thereto to apply the oscillator output to some independent circuit. The output of this stage produces the usable signal which is coupled capacitatively through condenser 162 from the top terminal of primary 146 to a stationary switch contact 164. At this point there therefore appears the amplified output of the oscillator, the frequency of which is determined by the particular part resident in the test coil 4 at that instant.

Having therefore produced a test signal of a given frequency the next section of the test system utilizes that frequency and indicates its departure from a given norm. The closure of switch arm 166 upon stationary contact 164 completes the circuit to the primary 168 of a coupling transformer 170, of the discriminator section. A condenser 172 is connected in shunt with the primary. A coupling condenser 174 is connected between the upper terminal of primary 168 and the center tap on secondary 176 of said transformer through line 178. The upper terminal of the secondary 176 is connected through line 180 with anode 182 of the double diode tube 184. The lower terminal of the secondary 176 is in like manner connected through conductive line 186 to the remaining anode 188 of the tube 184. Cathode 190 of the double diode rectifier tube 184 is connected through line 192 and resistor 194 to control grid 196 of the amplifying tube 198. Similarly cathode 200 of the second section is connected to line 202 through resistance 204 to control grid 206 of a further amplifying tube 208. An adjustable capacitor 210 is connected between lines 180 and 186 and together with the secondary 176 of the transformer 170 determines the frequency of the discriminator section. The output of the double rectifier in the discriminator is therefore connected across the voltage divider consisting of resistances 212 and 214 connected across lines 192 and 202 and produces a resultant output voltage. A pair of shunting capacities 216 and 218 shunt resistors 212 and 214 respectively. A further condenser 220 is directly connected across lines 192 and 202 on one side of the resistances 194 and 204 and a second condenser 222 directly interconnects the control grids 196 and 206. The cathodes 224 and 226 of the tubes 198 and 208 are commonly connected through biasing resistor 228 to ground. The intermediate point between resistances 212 and 214 is connected through conductive line 230 to one terminal of an inductance choke 232 the opposite terminal of which is connected to line 178 which extends to the center tap on secondary 176.

The amplified output of the discriminator is applied from plate 234 to one end of a potential divider consisting of three resistances 236, 238 and 240 in series across to plate 242 of tube 198. Plate 234 is likewise connected to an ammeter 244 and thence through operating relay coils 246 to an adjustable tap 248 which is movable over a resistor 250. One end of the resistor is left unconnected and the other end connected directly to plate 242 of tube 198. Operating coils 246 are adapted to move armature 252 upward into engagement with stationary contact 254 when the current flow therethrough is in one direction or downwardly into engagement with stationary contact 256 when the current flow therethrough is in the opposite direction. The movable armature 252 is connected directly through line 258 to one terminal of a further power relay operating coil 260, the opposite terminal of which is connected through line 262 to one line of a conventional source of 110 v. electrical current or power. Stationary contact 256 of the first sensitive differential relay is in like manner connected through line 264 to the other supply line of the conventional source.

Relay coil 260 is adapted to actuate a pair of movable armatures 266 and 268. Each one of these armatures has a normally closed position indicated as NC, and a normally open contact indicated as NO, the latter contacts being engageable by their respective armatures when the relay coil 260 is energized. Armature 266 controls supply circuits to various classifying and selecting relays connected to block 270. Thus when armature 266 assumes the position shown, a circuit would be completed to connector 272 to a control relay for classifying good parts, whereas when the armature 266 assumes the position to the right, a circuit would be completed through contact 274 for classifying unsatisfactory parts. Armature 268 on the other hand is adapted to provide energizing circuits for indicating lights 276 and 278 which indicate to the operator the same characteristics, said lights being connectible to the main voltage supply.

Line 108 which extends from the series regulating tube 72 is connected to further voltage regulating means which includes a duo triode tube 280 which provides the regulating bias voltage. The two plates 282 and 284 of tube 280 are connected through biasing resistors 286 and 288 to the main voltage supply line 114. A pair of resistances 290 and 292 are connected in series between the power line 114 and ground and their intermediate point is connected to cathode 294 of the first triode section to bias the same. A second potential divider consisting of resistances 296 and 298 in series between the power line 114 and ground has its intermediate point connected to control grid 300 of the second triode section. Control grid 302 of the first triode section is directly connected to the plate 284 of the second section. A bypass condenser 304 is connected across resistor 288. The circuit of the second cathode 306 includes two resistances 308 and 310 connected in series and a variably positionable grounded tap 312 movable over resistor 310, thus the bias on cathode 306 may be adjusted. Voltage regulating means consisting of a voltage regulating neon tube 314 and a series resistor 316 are connected between power line 114 and cathode 306. The purpose of this portion of the power supply unit is to provide an out of phase bias to adjust the resistance of series regulating tube 72 connected ahead of tube 280. Line 108 from the grids of tube 72 is connected directly to the plate 282 of tube 280.

In operation, as the voltage on supply line 114 rises, the voltage on grid 300 will also increase, increasing the conduction through the second triode stage and thus reducing the voltage on the plate 284. Since this plate is directly connected to control grid 302 of the first stage, the first stage will tend to reduce its flow increasing the voltage on its plate, however, the simultaneous increase in the voltage of cathodes 294 and 306 is greater than the control of the grids and the overall effect is to apply such a control voltage to grids 104 and 106, as to increase the resistance of the preceding series regulating tube 72 through said grid voltage which tends to reduce the voltage of line 114 and it returns to its desired value. Any lowering of the voltage on this line of course produces the opposite effect and the voltage on line 114 is thus maintained constant.

As previously mentioned, the variable condenser 210 is set to a point to provide the desired frequency for the discriminator zero or null. This produces zero voltage output in the discriminator at a desired frequency. However, if the resonant frequency which is produced by the oscillator with a given part under test falls outside of the range of adjustment of the condenser 210, there is provided a series of fixed condensers 318, 320, etc., one terminal of each of which is connected to stationary contacts 322 and 324, etc., and the opposite terminals commonly connected together. A movable switch arm 326 is provided for movement over the various stationary contacts so that any one of the capacitors may be switched into circuit to change the range of operation. The movable switch arm 326 is connected through line 328 to line 180 of the discriminator and the common terminals of all of the condensers are connected through line 330 to line 186 which is the opposite side of the discriminator input. Thus by moving arm 326 to various capacitors the range of operation may be quickly varied.

It is noted that connections into the system from outside elements are provided. These have no function as far as the normal operation is concerned, however, they indicate that the various points in portions of the system may be utilized together with outside apparatus to produce desired indications. For example, in FIGURE 3, at the top, there is a block diagram indicated at 332 having connecting lines 334 and 336 to the input circuit to control grids 122 and 120 respectively. By providing this connection the oscillator and amplifier which produces a certain frequency output may be directly connected to a counter to check the frequency of said oscillator. In like manner, to the right of the counter 332 there is shown a second block diagram labelled "discriminator input" 338 which is connected through line 340 to one of the stationary contacts 342 which is engageable by movable switch arm 166. By changing the position of arm 166 from engagement with stationary contact 164 to engagement with contact 342, any other signal which it is desired to impress upon a discriminator may be fed into the system to produce indications rather than the test signal produced by the oscillator. At this point, also, it should be noted that the phone jack 160 connected across the secondary 154 of the transformer 156 likewise provides a connection to the oscillator output so that that unit may be used to produce desired frequencies for other purposes and merely by plugging in a phone jack, the oscillator output may be taken off for any desired reason. Also, it is noted that switch contact 164 is connected back through line 344 and rectifier 346 to one end of the resistance 66 over which adjustable tap 64 may be moved. This line acts as a feedback limiter line and by adjusting the position of contact 64 on resistance 66, the amplitude of the oscillating waves may be varied. A voltage regulating tube 348 is connected between power line 28 and ground to further regulate the voltage appearing at this point.

In the operation of this electromagnetic testing system, the main switch 76 is closed energizing the power supply unit and applying suitable current to the filaments and regulated power to the main supply lines. Assuming that the apparatus has been adjusted through movement of variable tap 64 to provide the proper amplitude of signal and adjustable tap 248 to adjust the normal position of the relay and meter, the insertion of a fabricated part to be tested to a given position within the test coil 4 will cause the oscillator section including tube 24 to oscillate at a frequency determined by the composite part including the bond. The output of the oscillator is amplified through tubes 44, 124 and 126 and applied in a push-pull relation to the transformer primary 146—148 and thence capacitatively coupled to switch contact 164. At this point, therefore, there is found an alternating current signal whose frequency may vary over a certain range determined by the solidity of the brazed joint in the part being tested.

This high frequency signal is applied to the discriminator section which is tuned through adjustment of condenser 210 or condenser 210 in combination with one of the fixed condensers in the group 318, 320, etc. to a predetermined null frequency. If the frequency applied to the switch contact 164 is the same as that of the tuned discriminator circuit, then the voltages developed across resistances 212 and 214 will oppose and cancel and no voltage will be applied to the amplifier section following, and therefore again no resultant voltage will appear across the voltage divider 236, 238, 240 or across the indicating meter 244 and control relay coil 246. As the generated frequency departs from the null frequency due to differences in the structure of the brazed joint between the two parts, an increase in frequency will develop a resultant positive voltage at the output of the discriminator and a decrease in frequency, negative voltage. These voltages will cause the ammeter to read either above or below the zero and will cause the sensitive relay coils 246 to move the armature 252 upwardly or downwardly depending upon the direction of movement of the frequency. The system can be so adjusted that any frequency below a certain frequency will cause the switch 252 to illuminate signal lamp 278 which may be green and as the frequency passes above a certain frequency, cause the red light to come on, indicating that the joint in the part is not satisfactory. This is accomplished through actuation of a power relay including coil 260 which actuates two armatures 266 and 268. The movement of armature 268 switches between the two signal lamps 276 and 278, whereas the actuation of switch 266 may be connected to classifying relay apparatus so that the part may be diverted along one path or an alternate one.

We claim:

1. In testing means, oscillatory means having a frequency determining section including an inductance adapted to have parts to be tested introduced thereto to vary its value and tune the oscillatory means to different frequencies dependent upon the characteristics of a part, amplifying means having an input and an output circuit, said input circuit of said amplifying means being connected to said oscillatory means, a series feedback stabilizing circuit including a rectifier and adjustable impedance means connected between said output circuit of the amplifying means and the oscillatory means to provide for amplitude adjustment of the oscillatory waves produced and to stabilize operation of the system, discriminator means connected to the output circuit of the amplifying means and tunable to a desired frequency to produce positive or negative signals, as the oscillatory frequency exceeds or falls below the discriminator frequency, voltage divider means connected to the discriminator output across which the resultant positive or negative voltage is developed and polarized control means connected to the voltage divider means and responsive to the polarity and amplitude of the voltage across the voltage divider means to classify parts applied to the inductance.

2. In testing means, oscillatory means having a frequency determining section including an inductance adapted to have parts to be tested introduced thereto to vary its value and tune the oscillatory means to different frequencies dependent upon the characteristics of a part, amplifying means having an input and an output circuit, said input circuit of said amplifying means being connected to said oscillatory means, a series feedback circuit including rectifying means and adjustable impedance means connected between said output circuit of the amplifying means and the oscillatory means to provide for amplitude adjustment of the oscillatory waves produced and stabilize operation of the system, a discriminator connected to the output circuit of the amplifying means, said discriminator including an adjustable condenser to determine the center frequency of operation, a plurality of fixed condensers, switching means connected to said variable condenser and to said fixed condensers for selectively switching one of said fixed condensers in circuit with said variable condenser to change the discriminator center frequency in discrete steps, polarity conscious relay switching means connected to the discriminator moving in opposite directions with different polarity voltage applied and indicating means connected to said relay switching means and controlled thereby to indicate when the oscillator frequency being generated varies from a predetermined frequency and if it is above or below a predetermined frequency.

3. In testing means, oscillatory means having a frequency determining section including an inductance adapted to have parts to be tested introduced thereto to vary its value and tune the oscillatory means to different frequencies dependent upon the characteristics of a part, amplifying means having an input and an output circuit, said input circuit of said amplifying means being connected to said oscillatory means, a series feedback circuit including rectifying means and adjustable impedance means connected between said output circuit of the amplifying means and the oscillatory means to provide for amplitude adjustment of the oscillatory waves produced and stabilize operation of the system, a discriminator connected to the output circuit of the amplifying means, said discriminator including an adjustable condenser to determine the center frequency of operation, a plurality of fixed condensers, switching means connected to said variable condenser and to said fixed condensers for selectively switching one of said fixed condensers in circuit with said variable condenser to change the discriminator center frequency in discrete steps, voltage dividing means connected across the discriminator means for developing a polarity conscious output signal, voltage supply means adjustably connected to an intermediate point in the voltage dividing means to supply power thereto and polarity conscious indicating means connected to said voltage dividing means and moving in opposite directions with different polarity voltage applied to indicate to an observer when the frequency being generated varies from a predetermined reference frequency and if it is above or below said reference frequency to advise as to the condition of the part then present in the inductance associated with the oscillatory means.

References Cited in the file of this patent

UNITED STATES PATENTS

| | | |
|---|---|---|
| 2,329,810 | Zuschlag | Sept. 21, 1943 |
| 2,387,496 | Cornelius | Oct. 23, 1945 |
| 2,407,536 | Chapman | Sept. 10, 1946 |
| 2,423,617 | Rath | July 8, 1947 |
| 2,494,934 | Doucette | Jan. 17, 1950 |
| 2,566,767 | Hunt | Sept. 4, 1951 |
| 2,647,628 | Diamond | Aug. 4, 1953 |
| 2,807,720 | Charles | Sept. 24, 1957 |